United States Patent
Tanga (10) Patent No.: US 7,673,882 B2
(45) Date of Patent: Mar. 9, 2010

(54) COLLET HOLDER FOR A MULTI-JAW CHUCK

(76) Inventor: Robert P. Tanga, 1280 W. Peachtree St., #3206, Atlanta, GA (US) 30309

( * ) Notice: Subject to any disclaimer, the term of this patent is extended or adjusted under 35 U.S.C. 154(b) by 149 days.

(21) Appl. No.: 11/368,368

(22) Filed: Mar. 3, 2006

(65) Prior Publication Data

US 2006/0290077 A1    Dec. 28, 2006

Related U.S. Application Data

(60) Provisional application No. 60/658,454, filed on Mar. 4, 2005.

(51) Int. Cl.
    B23B 31/20    (2006.01)
(52) U.S. Cl. .............................. 279/52; 279/42; 279/46.4
(58) Field of Classification Search .................. 279/42, 279/43.1, 46.1, 46.2, 46.4, 47, 48, 51, 52; B23B 31/20
    See application file for complete search history.

(56) References Cited

U.S. PATENT DOCUMENTS

| | | | | |
|---|---|---|---|---|
| 2,162,856 A | * | 6/1939 | Nitsch | ......................... 279/52 |
| 3,365,204 A | * | 1/1968 | Benjamin et al. | ............. 279/51 |
| 3,534,970 A | * | 10/1970 | Glimpel | ..................... 279/2.11 |
| 3,746,353 A | | 7/1973 | Allen | |
| 3,810,641 A | * | 5/1974 | Benjamin | ..................... 279/51 |
| 4,046,390 A | * | 9/1977 | Dunham | ..................... 279/46.8 |
| 4,215,871 A | * | 8/1980 | Hirsch et al. | ................... 279/48 |
| 4,514,117 A | | 4/1985 | Scott | |
| 5,032,043 A | * | 7/1991 | Hollifield | .................... 409/234 |
| 5,071,145 A | | 12/1991 | Brook | |
| 5,133,566 A | * | 7/1992 | Baker | ......................... 279/156 |
| 5,417,527 A | * | 5/1995 | Wienhold | ............... 408/239 R |
| 5,794,949 A | * | 8/1998 | Pierce | ........................ 279/46.7 |
| 6,257,595 B1 | * | 7/2001 | Difasi et al. | ................... 279/50 |
| 6,520,508 B1 | * | 2/2003 | Jordan | ........................ 279/46.7 |
| 6,568,889 B2 | * | 5/2003 | Rohm | ......................... 409/233 |
| 7,306,238 B2 | * | 12/2007 | Oshnock et al. | ................ 279/20 |
| 2003/0184028 A1 | * | 10/2003 | Schlotterer | .................... 279/51 |
| 2004/0164502 A1 | | 8/2004 | Taguchi | |
| 2005/0023774 A1 | | 2/2005 | Mack | |
| 2007/0290457 A1 | * | 12/2007 | Walters | ........................ 279/48 |

* cited by examiner

*Primary Examiner*—Eric A Gates
(74) *Attorney, Agent, or Firm*—Woodcock Washburn LLP; Barry E. Kaplan (57) ABSTRACT

A collet holder for insertion into a multi-jaw chuck. The collet holder includes a multi-faceted body having a smooth bore extending therethrough for housing a standard collet and a cap nut threadably secured to the body.

18 Claims, 7 Drawing Sheets

Fig_9

Fig_10

Fig_11

Fig_12

US 7,673,882 B2

COLLET HOLDER FOR A MULTI-JAW CHUCK

CROSS-REFERENCE AND PRIORITY CLAIM TO RELATED APPLICATION

To the full extent permitted by law, the present Patent Cooperation Treaty Application claims priority to and the benefit of U.S. Non-Provisional Patent Application entitled "Collet Holder for a Multi-Jaw Chuck," Ser. No. not yet assigned, filed on Mar. 3, 2006, on behalf of inventor Robert Tanga, and to U.S. Provisional Patent Application entitled "Collet Holder for a Multi-Jaw Chuck", filed on Mar. 4, 2005, on behalf of inventor Robert Tanga, and having assigned Ser. No. 60/658,454.

FIELD OF THE INVENTION

The present invention relates generally to lathes and particularly to a collet holder for insertion into a multi-jaw chuck.

BACKGROUND OF THE INVENTION

A standard lathe typically has either a multi-jaw chuck (typically, a 3, 4, or 6 jaw chuck) threaded or cam locked to the spindle for holding a large tool or has a collet holder threaded or cam locked to the spindle for holding a smaller tool with a smooth shank. Chucks and collet holders can be interchanged; however, the chucks can weigh one hundred pounds or more. Thus, interchanging various chucks or interchanging a chuck with a collet holder takes quite of bit of time and manpower.

Thus, it can be seen that needs exist for an adapter to a multi-jaw chuck that can hold collets without removing the chuck and installing a collet holder directly to the headstock.

SUMMARY OF THE INVENTION

Briefly described, the present invention comprises a collet holder for insertion directly into a multi-jaw chuck, which collet holder obviates the need for interchanging the chuck with a standard collet holder (which otherwise would be inserted directly into the spindle). The collet holder has a multi-faceted body, which is adapted to be inserted into any of a 3, 4, or 6 jaw chucks.

In one aspect, the present invention comprises a collet holder having a body with a smooth bore extending therethrough for housing a standard collet and a cap nut threadably secured to the body. The body also includes a plurality of push rods that can be engaged by the cap nut to push on a rear plate of the body. The rear plate has a threaded bore for engaging a threaded portion of the collet. Thus, when the cap nut is tightened against the push rods, it pushes the plate rearwardly, which in turn draws the collet into the collet holder and causes the collet to close.

In yet another aspect, the present invention comprises a collet holder that has a body having a smooth bore extending therethrough, with a tapered seat, and a cap nut that, when tightened against the body, causes the collet to be pushed farther into the collet holder, thus seating the collet against the tapered seat and closing the collet.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

To the full extent permitted by law, the present Patent Cooperation Treaty Application claims priority to and the benefit of U.S. Non-Provisional Patent Application entitled "Collet Holder for a Multi-Jaw Chuck," Ser. No. not yet assigned, filed on Mar. 3, 2006, on behalf of inventor Robert Tanga, and to U.S. Provisional Patent Application entitled "Collet Holder for a Multi-Jaw Chuck", filed on Mar. 4, 2005, on behalf of inventor Robert Tanga, and having assigned Ser. No. 60/658,454.

The present invention may be understood more readily by reference to the following detailed description of the invention taken in conjunction with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
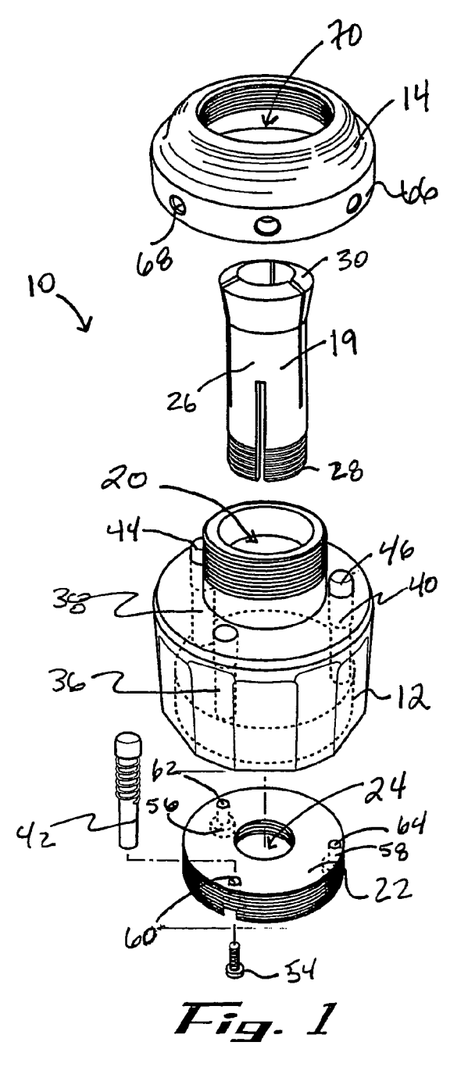
FIG. 1 is a perspective view of a collet holder in accordance with an illustrative form of the present invention.
Figure 7:
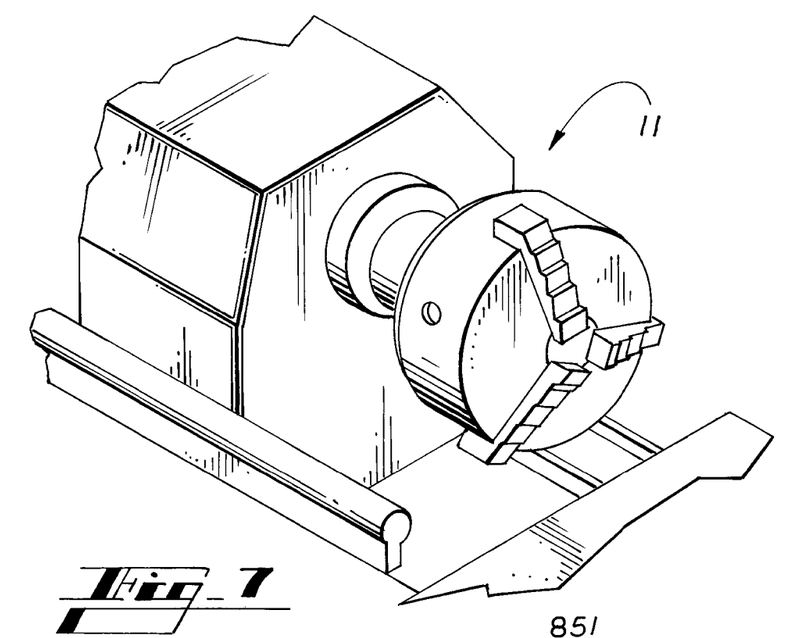
FIG. 7 shows a multi-jaw chuck, which is the environment for the collet holders of FIGS. 1 and 4.

With reference now to FIG. 1, a first exemplary embodiment of a collet holder 10 is illustrated for insertion into a multi-jaw chuck, such as the multi-jaw chuck 11 shown in FIG. 7. The collet holder 10 of FIG. 1 has a body or housing 12 and a large nut or cap 14 that is threadably coupled to the body. The body 12 has a proximal end 16 and a distal end 18. A bore 20 extending through the body 12 receives and houses a (standard) collet 19. Preferably, the bore 20 is smooth and has a tapered seat 21 at its distal end. At the proximal end 16 of the collet holder 10 is a plate 22 having a bore 24 extending therethrough, which aligns with the bore 20 of the body 12. Also preferably, the bore 24 is threaded.

Preferably, the collet 19 is a "5C" collet that has a generally smooth body 26 with a plurality of slits therein. At the proximal end of the collet 19 is a male threaded portion 28 that cooperates with the female threaded portion of the bore 24. At the distal end of the collet 19 is a frusto-conical head portion 30 that flares towards the collet's distal end.

Figure 3:
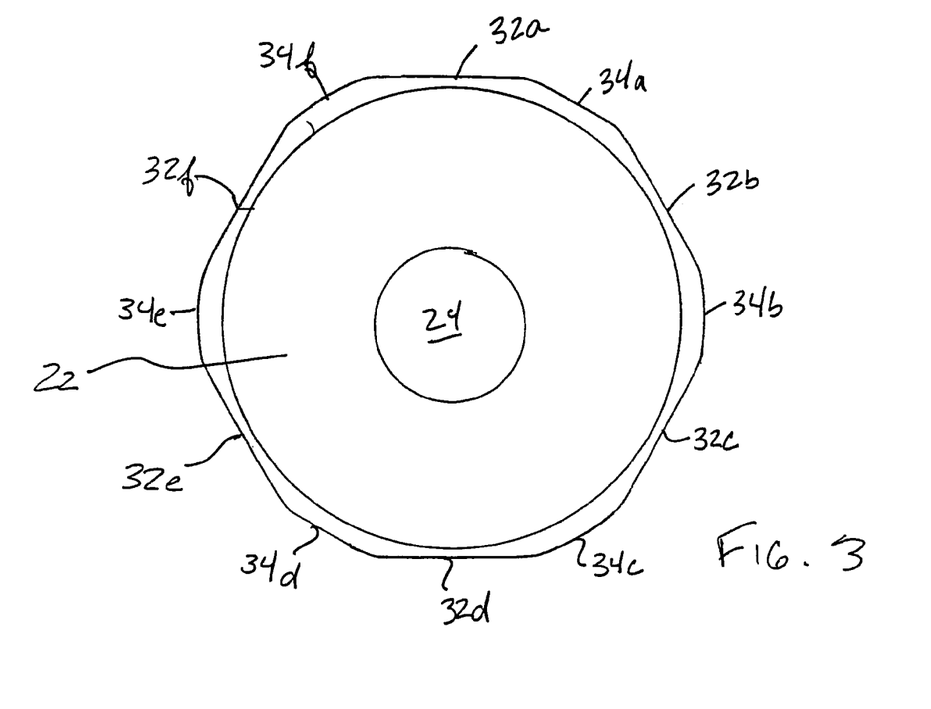
FIG. 3 is a rear view of the collet holder of FIG. 1.

The body 12 is a multi-faceted piece having a plurality of facets (or flat surfaces) 32 and 34 around its outer periphery, as seen more clearly in FIG. 3. The multiple facets 32 and 34 are configured so that the collet holder 10 can be adapted to any of a 3, 4, or 6 jaw chuck. In the depicted embodiment, two sets of facets are shown. The first set of facets (or flat surfaces) 32a-f is wider than the second set 34a-f and is configured at about 60° relative to one another for convenient use in a 3 or 6 jaw chuck (hence, when inserted into a 3-jaw chuck, the jaws will contact three of the wide facets, such as facets 32b, 32d, and 32f that are spaced about 120° relative to one another, and when inserted into a 6-jaw chuck, the jaws will contact all six of the wide facets 32a, 32b, 32c, 32d, 32e, and 32f that are spaced about 60° relative to one another). The second set of facets (or flat surfaces) 34a-f includes narrower facets that are interposed between those of the first set, so as to create four flat facets that are at 90° to one another so that the body can be inserted into a 4-jaw chuck (i.e., the jaws of a 4-jaw chuck will contact two of the narrow facets, such as 34b and 34e, and two of the wide facets such as 32a and 32d). Thus, a single collet holder 10 can be adapted for insertion into 3, 4, and 6 jaw chucks.

Figure 2:
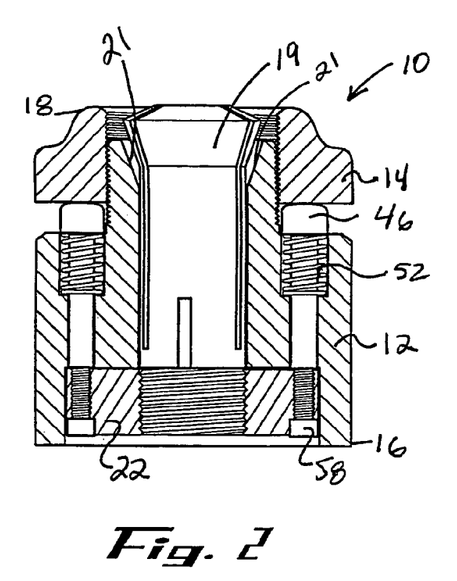
FIG. 2 is a partially cutaway view of the collet holder of FIG. 1.

The body 12 also includes a plurality, preferably three, of cylindrical openings 36, 38, and 40 therein for receiving a corresponding number of button or mushroom-headed push rods, preferably three push rods, 42, 44, and 46, that surround the bore 20 and that are configured to push on the rear plate 22. Surrounding each push rod 42, 44, and 46 are compression springs, two of which are not shown and spring 52, respectively. The push rods 42, 44, and 46, along with the three springs, are inserted into openings 36, 38, and 40 of the body 12, as seen more clearly in FIG. 2. It should be noted that FIG. 2 shows a partially cutaway view of a modified version of the collet holder 10. In FIG. 2, two diametrically opposed push rods are shown, whereas in FIG. 1, three push rods equidistantly spaced around the bore 20 are shown. Also, it should be noted any number of push rods, including 2 or 4 push rods, can be used without deviating from the scope of the present invention. The push rods 42, 44, and 46 are secured in place with a plurality of cap screws 54, 56, and 58 that are inserted through openings 60, 62, and 64 in the plate 22.

Preferably, the nut 14 is a spanner nut that has a shoulder 66 with at least one socket 68 therein for engaging a tooth of a spanner wrench. When tightened with a spanner wrench, the shoulder 66 of the nut 14 contacts the button-headed push rods 42, 44, and 46 and exerts a force on the push rods which overcomes the biasing force of the springs and causes the rods to push on the plate 22, which in turn draws the plate and collet 19 rearwardly (toward the proximal end). As the collet 19 is drawn further into the collet holder 10, the frusto-conical head portion 30 of the collet is drawn rearwardly into the tapered seat 21 of the bore, which causes the frusto-conical head portion of the collet to close around the tool therein and securely hold the stock therein. Also preferably, the nut 14 has a bore 70 that is large enough to allow the collet 19 to be inserted therethrough. In other words, and as seen in the exploded view of FIG. 2, the nut 14 can be threadably secured to the body 12, and then the collet 19 can be inserted through the nut and into the body.

Additionally, the rear of the collet holder can be spring-loaded so as to allow the collet holder 10 to be more easily removed from the chuck 11.

In operation, the user inserts the collet holder 10, with the collet 19 therein, into the chuck 11 and tightens the jaws of the chuck against the appropriate facets of the collet holder. The user loosens the nut 14 some, which opens the collet 19. The user inserts the tool to be used into the collet 19. The user tightens the nut 14 with a spanner wrench, which in turn causes the shoulder 66 of the nut to contact and exert a force on the button headed push rods 42, 44, and 46. This pushes the plate 22 rearwardly (toward the proximal end), which pulls the collet 19 rearwardly and in turn pulls the frusto-conical head portion 30 of the collet into the tapered seat 21, closes the collet around the tool, and grips the tool with sufficient force to perform machining operations. It should be noted that above steps can occur in almost any order (for example, the user can insert the body 12 of the collet holder 10 into the chuck 11, and then insert the collet 19, and then tighten the nut 14).

Figure 4:
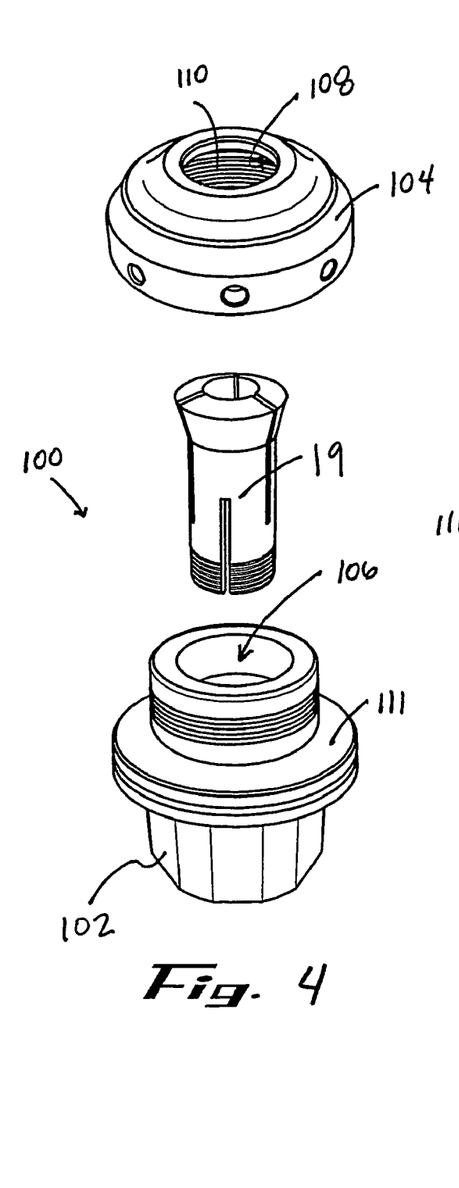
FIG. 4 is an exploded perspective view of a collet holder in accordance with another illustrative form of the present invention.
Figure 5:
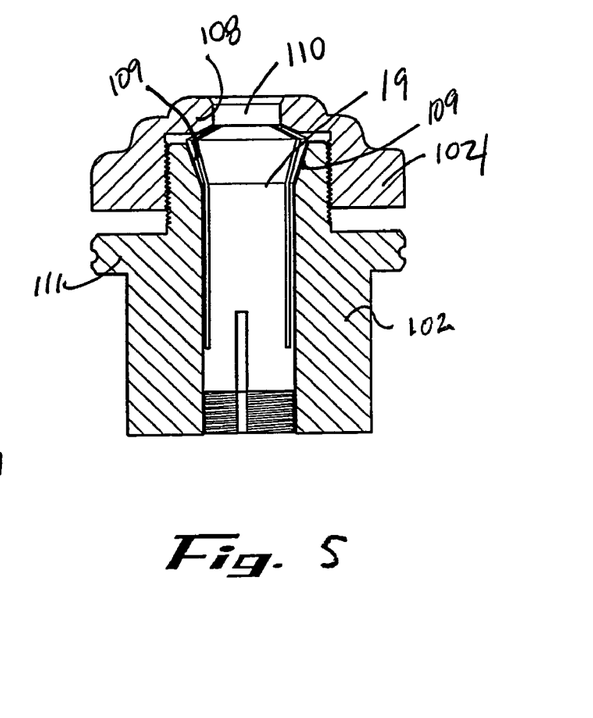
FIG. 5 is a partially cutaway view of the collet holder of FIG. 4.

With reference now to FIGS. 4 and 5, a second exemplary embodiment of the collet holder 100 for insertion into a multi-jaw chuck 11 is shown. The collet holder 100 is substantially similar to the collet holder 10, but with the exceptions noted here. The collet holder 100 has a body or housing 102 and a nut or cap 104 that is threadably coupled to the body. The body 102 has a smooth keyed bore 106 extending therein for receiving and housing a collet 19 (a description of which has been provided herein).

As depicted in FIGS. 4 and 5, the nut 104 includes an inner bore 110 having a diameter that is slightly smaller than the diameter of the frusto-conical head portion of the collet 19 (but the diameter is also large enough to accommodate the shank of the stock that will be inserted into the collet), which defines a crown portion 108. Within the distal end of the bore 110 is a tapered seat 109. The body 102 can also include a ledge 111, such that the nut 104 can tighten towards and against the ledge 111. Also, unlike the collet holder 10, the collet holder 100 does not have push rods or a threaded rear plate.

Figure 6:
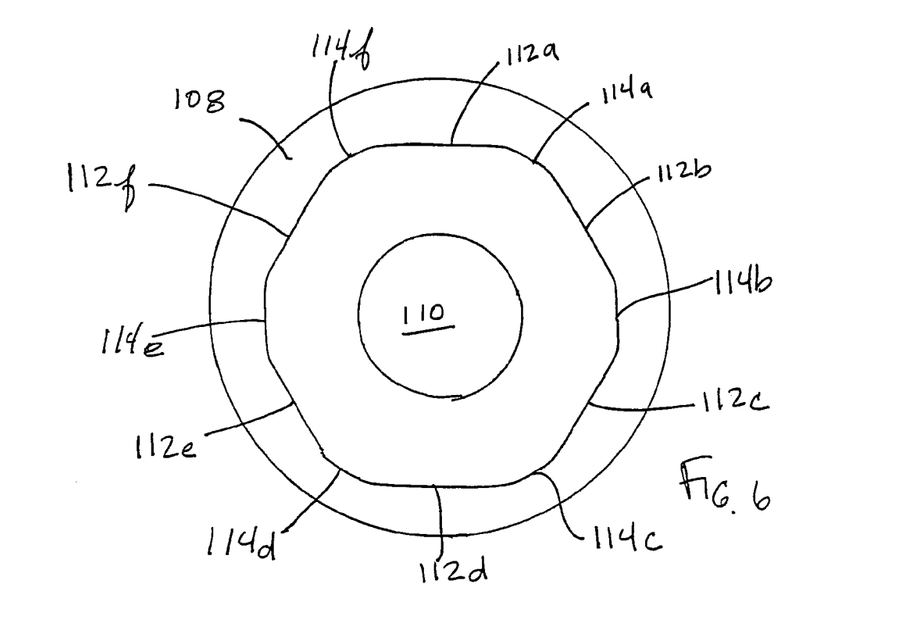
FIG. 6 is a rear view of the collet holder of FIG. 4.

As in the first embodiment, the body 102 has a plurality of flat surfaces or facets 112a-f and 114a-f around its outer periphery for allowing the collet holder 100 to be inserted-any of a 3, 4, or 6 jaw chuck as described herein, as depicted in FIG. 6.

In operation, the user inserts the collet holder 100, holding the collet therein, into the chuck 11 with the nut 104 partially tightened to the body 102. The user loosens the nut 102 and inserts the tool to be used into the collet 19. The nut 104 is tightened against the body such that crown portion 108 tightens against the head of the collet 19 and towards the ledge 111, which in turn pushes the collet rearwardly and forces the collet into the tapered seat 109. As the collet 19 is pushed rearwardly, the frusto-conical head portion 30 is pushed into the tapered seat 109, which closes the collet around the tool and causes the collet to grip the tool with sufficient force to perform machining operations. It should be noted that above steps can occur in almost any order (for example, the user can insert the collet holder 100 into the chuck 11 once it is fully assembled with the collet and stock held therein).

Preferably, the collet holders 10 and 100 are constructed of a durable material, such as a metal or metal alloy.

Notably, the collet holders 10 and 100 can be interchanged between a chuck and a vice. Thus, the collet holders 10 and 100, with the collet and stock therein, can be inserted into a vice and then returned to the jaws of the chuck without any reassembly.

Figure 8:
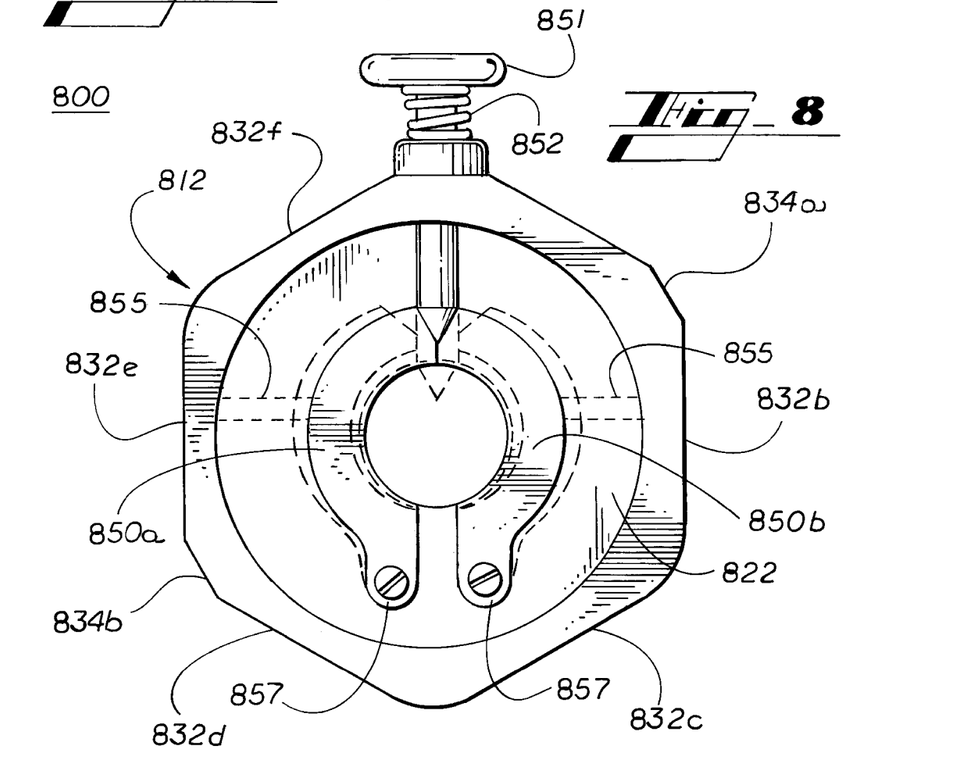
FIG. 8 is a rear view of another alternative embodiment of a collet holder according to the present invention.

Referring now to FIG. 8, collet holder 800 includes body 812 having wide facets 832a-f and narrow facets 834a and b for engagement with jaws of a chuck. Plate 822 includes half-nut assembly 850 surrounding bore 820. Half-nut assembly 850 comprises first half 850a and second half 850b, each half rotatably attached to base plate 822, preferably by hinges 857. Half-nut assembly 850 also comprises pin 851 accessible from a location outside body 812. Preferably, half-nut assembly 850 also includes at least one biasing member such as spring 855 that provides a force retaining first half 850a and second half 850b in a closed position, illustrated by solid lines, wherein a gripping force is exerted by half-nut assembly 850 on an object disposed within bore 820. Pin 851 can be used to separate first half 850a and second half 850b, placing them in an open position, illustrated by dashed lines, wherein no gripping force is exerted by half-nut assembly 850 on an object disposed in bore 820, whereby the object, such as a collet, can be easily removed from bore 820. Fig. 8 illustrates by dashed line where two springs 855 may be placed to provide biasing force to keep half nut assembly 850 in the closed position. Furthermore, first half 850a and second half 850b preferably each include threads for engagement with threads on an object disposed in bore 820 in order to increase a retaining force retaining the object disposed within bore 820.

In use, collet holder 800 retains a collet disposed within bore 820 by a retaining force applied by the engagement of first half 850a and second half 850b with the collet, preferably by threaded engagement. When a user desires to remove the collet, such can be accomplished quickly and easily by opening half nut assembly 850 by pushing pin 851 to separate first half 850a and second half 850b, thereby disengaging first half 850a and second half 850b from the collet. The collet can then be removed and replaced without removing collet holder 800 from the jaws of a multi-jaw chuck. When the user desires to place collet or other workpiece within collet holder 800, the user opens collet holder 800 by pushing pin 851 and inserts the collet into bore 820. In order to secure the collet, the user need only release pin 851, which is withdrawn by a biasing force of spring 852, allowing the biasing force of spring 855 to close first half 850a and second half 850b, thereby securely engaging the collet and retaining the collet in bore 820.

Figure 9:
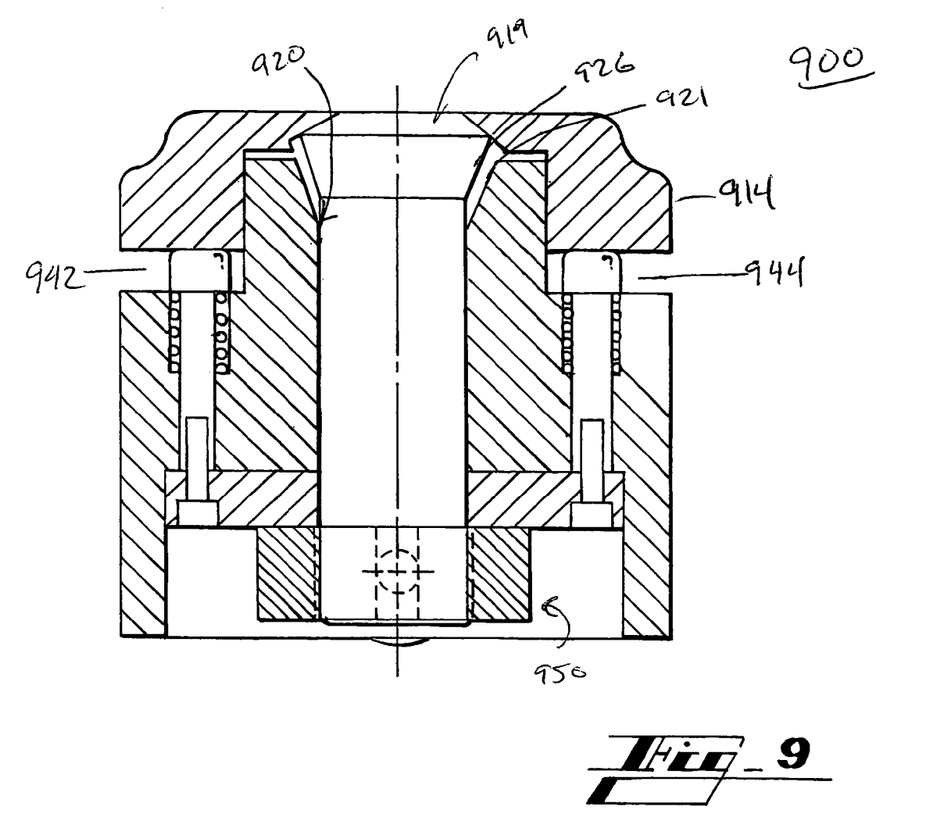
FIG. 9 is a partial cut-away side view of the collet holder of FIG. 8 in a closed configuration.

Now referring to FIG. 9, collet holder 900 is shown including push rods 942 and 944 along with half-nut assembly 950 in a closed position. Half-nut assembly 950 can be used as described above to allow quick and easy removal and installation of collet 919 in bore 920. Cap 914 can be used to draw frusto-conical head portion 926 of the collet is drawn rearwardly into the tapered seat 921 to retain a tool or stock within collet 919.

Figure 10:
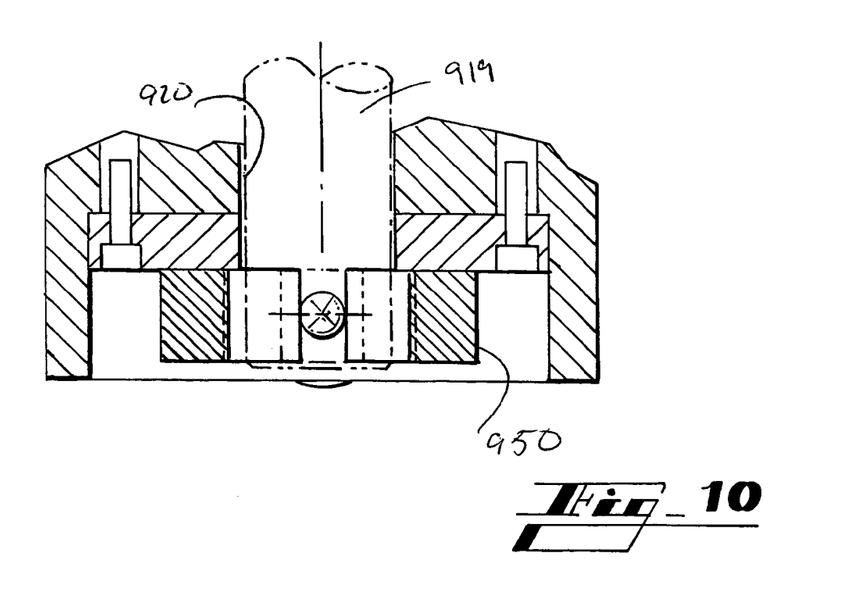
FIG. 10 is a partial cut-away side view of the collet holder of FIG. 8 in an open configuration.

FIG. 10 shows half-nut assembly 950 in an open configuration whereby collet 919 can be removed from bore 920.

Figure 11:
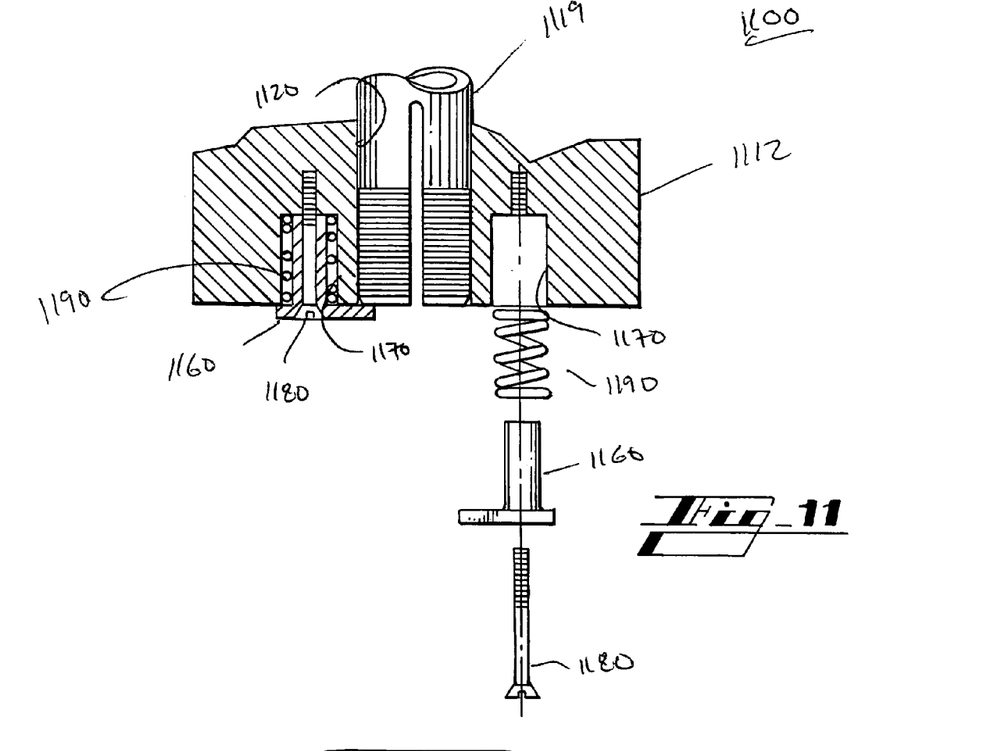
FIG. 11 is a partial cut-away view of another alternative embodiment of a collet holder according to the present invention.

Now referring to FIG. 11, collet holder 1100 comprises body 1112 including bore 1120 in which collet 1119 is disposed and retained, preferably by threaded engagement. Collet holder 1100 also includes feet 1160 retained in receptacles 1170 by screws 1180, or other conventional means. Feet 1160 are biased in receptacles 1170 by springs 1190. Feet 1160 preferably extend radially partially into bore 1120 such that a portion of spindle 1119 engages feet 1160 when fully inserted into bore 1120. As spindle 1119 is inserted further through bore 1120 feet 1160 are partially extracted from receptacles 1170, thereby stretching springs 1190 creating a tension in springs 1190. Thus, when a retaining force, such as that provided by half-nut assembly 850, is released, the tension in springs 1190 causes feet 1160 to eject collet 1119 from bore 1120.

Figure 12:
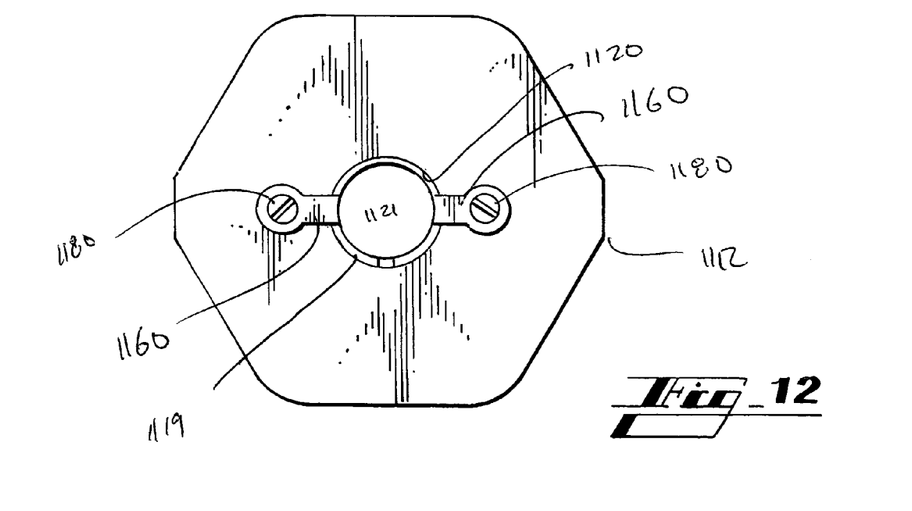
FIG. 12 is a bottom view of the collet holder of FIG. 11.

FIG. 12 shows that preferably feet 1160 do not extend into a bore 1121 within collet 1119 such that a tool or stock disposed within bore 1121 is not obstructed from passing through bore 1121 by feet 1160.

Figure 13:
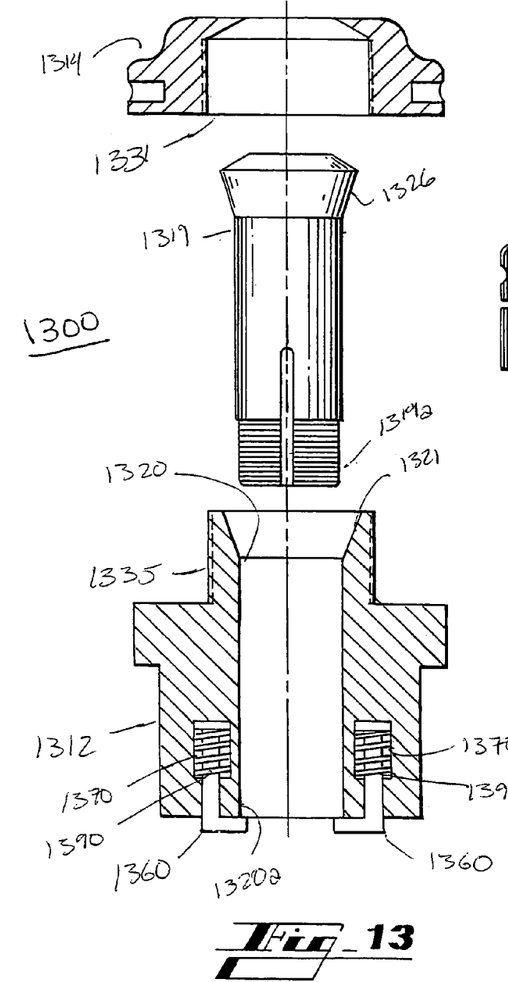
FIG. 13 is an exploded partial cut-away side view of the embodiment of FIG. 12.

Now Referring to FIG. 13, collet holder 1300 comprises cap 1314 disposed over collet 1319, retaining collet 1319 in bore 1320 of body 1312. Threads 1331 of cap 1314 prefereably engage threads 1335 of body 1312, thereby drawing frusto-conical head portion 1326 of collet 1319 into engagement with tapered seat 1321 of bore 1320. As collet 1319 is drawn further into bore 1320, tapered seat 1321 exerts a force on frusto-conical head portion 1326, thereby retaining a tool or stock disposed within collet 1319. As bottom portion 1319a of collet 1319 passes bottom portion 1320a of bore 1320 when collet 1319 is drawn into bore 1320, bottom portion 1319a engages portions of feet 1360 extending radially into bore 1320. Drawing collet 1319 further into bore 1320 causes bottom portion 1319a to draw feet 1360 out of receptcles 1370, overcoming a biasing force provided by springs 1390. In this way, collet 1319 receives a biasing force that forces collet 1319 out of bore 1320 as cap 1314 is removed from threaded engagement with body 1312. This biasing force on collet 1319 ensures that when can 1314 is loosened from body 1312 a tool or stocl is likewise loosened from collet 1319, and, further, that collet 1319 is ejected from bore 1320.

Figure 14:
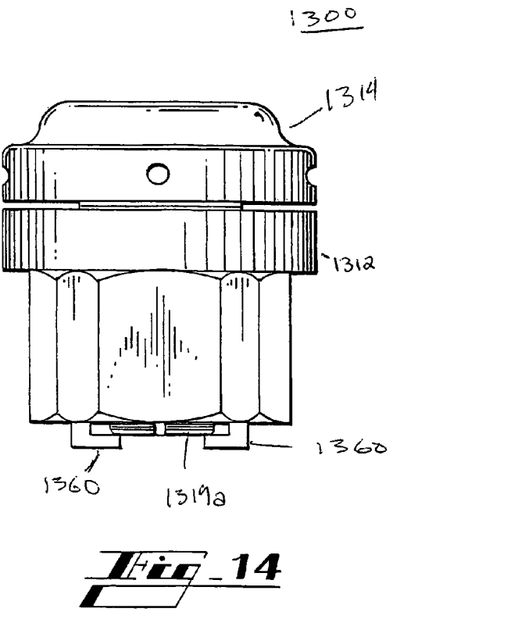
FIG. 14 is a side view the embodiment of FIG. 12.

Now referring to FIG. 14, collet holder 1300 is shown with cap 1314 in threaded engagement with body 1312. As can be seen, bottom portion 1319a protrudes below bottom portion 1320a and engages feet 1360. In this configuration, feet 1360 are in tension and provide an upward biasing force capable of ejecting collet 1319 from body 1312.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A collet holder adapter apparatus for use with a multi-jaw chuck mounted on a lathe to allow the multi-jaw chuck to hold a collet without damaging the collet, the collet holder apparatus comprising:

a body adapted to be inserted into and held by the jaws of the multi-jaw chuck, said body including a throughbore extending completely therethrough for receiving a collet therein, said body having a threaded end for receiving a nut and a tapered seat; and a nut threaded onto the threaded end of the multi-faceted body for securing the collet in the throughbore;

wherein said nut indirectly forces a portion of the collet against said tapered seat to secure the collet and to tighten the collet.

2. The collet holder adapter apparatus as claimed in claim 1, wherein said body comprises a plurality of facets, not all of which are the same size.

3. The collet holder adapter apparatus as claimed in claim 1, wherein said body comprises 12 facets, some of which are spaced ninety degrees from one another to work with a 4-jaw chuck and some of which are spaced 60 degrees from one another to work with a 3 or 6-jaw chuck.

4. The collet holder adapter apparatus of claim 1, wherein said nut acts on at least one pushrod, and wherein said at least one pushrod is operable with a rigid member secured to a back end of the collet to pull the collet snugly against said tapered seat.

5. The collet holder adapter apparatus of claim 1, wherein said body is removable from the chuck and is operable with a vice.

6. The collet holder adapter apparatus of claim 1, further comprising a retaining member adapted to securely retain the collet and to transmit a force applied by said nut to the collet, wherein said retaining member is adapted to release the collet via separation of opposing portions thereof.

7. The collet holder adapter apparatus of claim 6, further comprising a pin operable with said retaining member to separate said opposing portions to release the collet.

8. The collet holder adapter apparatus of claim 1, further comprising a retaining member adapted to securely retain the collet and to transmit a force applied by said nut to the collet.

9. The collet holder adapter apparatus of claim 1, wherein the collet is biased away from said tapered seat, and wherein said nut overcomes said bias to secure the collet and to tighten the collet.

10. The collet holder adapter apparatus of claim 1, further comprising at least one foot adapted to bias the collet away from said tapered seat.

11. A collet holder apparatus comprising:
a body having a bore therethrough and a tapered seat adapted to receive at least a portion of a collet;
a nut operable with said body, wherein adjustment of said nut selectively forces the at least a portion of the collet against said seat; and
a biased member operable with a second portion of the collet to bias the at least a portion of the collet away from said seat.

12. The collet holder apparatus of claim 11, wherein a workpiece having an external dimension approximately equal to an internal dimension of the collet may extend through and beyond the collet.

13. The collet holder apparatus of claim 11, wherein said seat is disposed proximate a first end of said bore and wherein said nut is operable to pull the at least a portion of the collet against said face from a second opposing end of said bore.

14. The collet holder apparatus of claim 11, wherein said nut is threadably engageable with said body to directly force the at least a portion of the collet against said seat, thereby tightening the collet about a workpiece disposed therein.

15. The collet holder apparatus of claim 11, wherein said body comprises a plurality of generally flat faces disposed about an exterior thereof, wherein a plurality of said generally flat faces are adapted to engage jaws of a chuck, and wherein at least one other one of said generally flat faces is adapted to engage a jaw of a vice.

16. The collet holder apparatus of claim 11, wherein said bore comprises a key adapted to prevent rotation of the collet within said bore.

17. The collet holder apparatus of claim 11, further comprising at least one push rod adapted to apply an axial force to the collet to at least one of force the at least a portion of a collet against said face and force the collet away from the face.

18. A collet holder apparatus for use with a multi-jaw chuck to retain a workpiece, said collet holder apparatus comprising:
a body having a plurality of generally flat surfaces disposed about an exterior thereof a bore extending generally centrally therethrough, and a tapered seat disposed proximate a first end of said bore;
a nut operable with said body to force the collet against said tapered seat; and
at least one biased member operable with said body to bias the collet away from said tapered seat,
wherein said nut is operable to force the collet against said tapered seat via at least one push rod and a split nut, said split nut being selectively separable to selectively engage the collet and retain the collet within the split nut.

* * * * *